(No Model.)

C. M. IMBRIE.
SPOOL CASE.

No. 421,280. Patented Feb. 11, 1890.

WITNESSES

INVENTOR

Attorney

UNITED STATES PATENT OFFICE.

CHARLOTTE M. IMBRIE, OF NEW YORK, N. Y.

SPOOL-CASE.

SPECIFICATION forming part of Letters Patent No. 421,280, dated February 11, 1890.

Application filed April 12, 1889. Serial No. 306,984. (No model.)

*To all whom it may concern:*

Be it known that I, CHARLOTTE M. IMBRIE, of the city of New York, in the county of New York and State of New York, have invented a new and useful Improvement in Spool-Cases, of which the following is a specification, reference being had to the accompanying drawings.

Heretofore spool-cases of the same general exterior form as my invention have been in use; but such spool-cases have been open to the following practical objections and have been very unsatisfactory: When thread was withdrawn from a spool, that spool continued to revolve after the required quantity of thread was withdrawn. The spool then overrun, and as a consequence the thread upon it became so snarled and entangled that the last half or more of the contents of the spool became useless and was wasted. Again, in these spool-cases the spool revolved so freely that any accidental disturbance oftentimes caused the spool to turn when the spool-case was not in use, thus giving rise to the same practical difficulty.

My invention consists of constructions and combinations, all as will hereinafter be described in the specification, and pointed out in the claim, reference being had to the accompanying drawings, in which—

Figure 1:
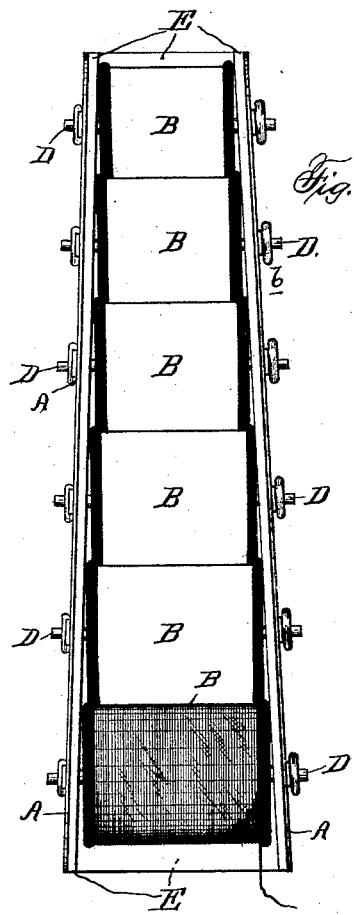
Figure 2:
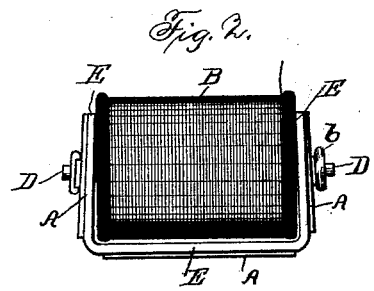
Figure 3:
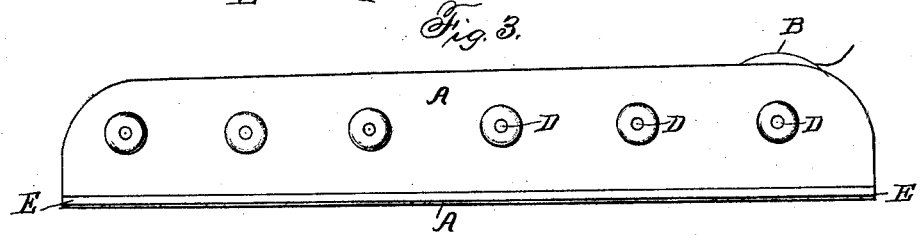

Figure 1 represents a front elevation, Fig. 2 an end elevation, and Fig. 3 a side elevation, of my device.

A A represent the sides and bottom of the spool-case, which may be made of celluloid, leather, wood, metal, or other substance; B B, the spools in position in said spool-case, wherein they are secured by rods D, provided with a screw-threaded end and a nut $b$, which is removable from the rod D, so that the latter can be withdrawn and the spool removed from the case without disturbing the others. The use of the rods D also has the advantage that the frictional resistance to be overcome in withdrawing the thread from each spool can be separately regulated at will.

E represents an elastic lining to the sides and bottom of my spool-case, so arranged that it bears upon the ends and bottom edges of the spools to serve as a brake, as hereinbefore set forth. For this elastic lining I have used felt, since it is cheap and efficient; but any other similar elastic substance will answer.

My invention operates as follows: The spools are inserted in the spool-case, as hereinbefore indicated, during which operation the sides are so brought into contact with the ends of the spools that the elastic lining presses against them. The elastic lining will then act as a brake upon the spools to arrest their revolution the moment the force which withdraws the thread ceases.

Having thus described my invention, what I claim as new, and desire to patent, is—

The combination, with a spool case or holder having a lining of elastic material abutting against the ends of the spools contained therein, of retaining-rods passing through said spools, the case, and its lining and having nuts for regulating the pressure of the lining upon the ends of the spools, substantially as described.

In testimony that I claim the foregoing improvement in spool-cases, as above described, I have hereunto set my hand this 26th day of March, 1889.

CHARLOTTE M. IMBRIE.

Witnesses:
 CHAS. F. IMBRIE,
 HENRY P. WELLS.